United States Patent
McKee et al.

(10) Patent No.: US 9,874,358 B2
(45) Date of Patent: Jan. 23, 2018

(54) OVEN BASED ON A COMBINATION OF HEATED AIR AND INFRARED HEATING ELEMENT

(71) Applicant: APPLIANCE INNOVATION, INC., Dallas, TX (US)

(72) Inventors: Philip R. McKee, Frisco, TX (US); Andrew Lawrence Podevels, Williston, VT (US); Charles J. Martis, Murphy, TX (US)

(73) Assignee: APPLIANCE INNOVATION, INC., Dallas, TX (US)

( * ) Notice: Subject to any disclaimer, the term of this patent is extended or adjusted under 35 U.S.C. 154(b) by 164 days.

(21) Appl. No.: 14/704,732

(22) Filed: May 5, 2015

(65) Prior Publication Data

US 2016/0327278 A1    Nov. 10, 2016

(51) Int. Cl.
| | | |
|---|---|---|
| *A21B 1/00* | (2006.01) | |
| *A21B 1/22* | (2006.01) | |
| *F24C 15/32* | (2006.01) | |
| *A21B 1/24* | (2006.01) | |

(Continued)

(52) U.S. Cl.
CPC ............ *F24C 15/325* (2013.01); *A21B 1/245* (2013.01); *F24C 7/06* (2013.01); *F24C 7/085* (2013.01)

(58) Field of Classification Search
CPC .......... F24C 7/043; F24C 7/062; F24C 15/24; F24C 15/325
USPC ....... 219/411, 680, 531, 601, 756, 385–401; 99/339, 401, 473; 126/21 A, 190, 275 E;

(Continued)

(56) References Cited

U.S. PATENT DOCUMENTS

| | | | |
|---|---|---|---|
| 4,338,911 A | * | 7/1982 | Smith .................... A21B 1/245 126/21 A |
| 4,517,448 A | | 5/1985 | Crain et al. |

(Continued)

FOREIGN PATENT DOCUMENTS

WO    1990008449 A1    7/1990

OTHER PUBLICATIONS

International Search Report for PCT/US2016/029346 dated Jul. 27, 2016.

(Continued)

*Primary Examiner* — Tu B Hoang
*Assistant Examiner* — Joseph Baillargeon
(74) *Attorney, Agent, or Firm* — Amster, Rothstein & Ebenstein LLP (57) ABSTRACT

A cooking oven comprising a housing, a cavity, an oven door, an air plenum, an infrared heating element, and a thermal insulating layer placed between the infrared heating element and the air plenum is disclosed. The infrared hearing element comprises a wire-like heating element shaped in a serpentine-pattern to form a plurality of fingers. The thermal insulating layer comprises a plurality of air channels interconnecting the air plenum and the cavity, and one or more temperature decoupling chambers for thermally insulating the air plenum from the infrared heating element. The air channels are positioned interleavingly between the plurality of fingers so that airstreams coming from the air plenum through each of the air channels into the cavity do not substantially contact and convectively cool the infrared heating element. The temperature decoupling chambers may use air as a thermal insulator.

8 Claims, 6 Drawing Sheets

(51) Int. Cl.
*F24C 7/06* (2006.01)
*F24C 7/08* (2006.01)

(58) Field of Classification Search
USPC ............... 392/355, 356, 360–368, 375–377, 392/407–440; 432/145
See application file for complete search history.

(56) References Cited

U.S. PATENT DOCUMENTS

| | | | |
|---|---|---|---|
| 4,739,697 A * | 4/1988 | Roberts | A47J 31/06 |
| | | | 210/474 |
| 4,756,091 A | 7/1988 | Van Denend | |
| 4,881,519 A | 11/1989 | Henke | |
| 5,382,441 A | 1/1995 | Lentz et al. | |
| 5,423,248 A * | 6/1995 | Smith | A21B 1/245 |
| | | | 126/21 A |
| 5,867,920 A | 2/1999 | Rogne et al. | |
| 5,906,485 A | 5/1999 | Groff et al. | |
| 6,114,664 A | 9/2000 | Cook et al. | |
| 6,369,360 B1 | 4/2002 | Cook | |
| 6,521,870 B2 | 2/2003 | Nolan et al. | |
| 6,595,117 B1 * | 7/2003 | Jones | A47J 37/0857 |
| | | | 99/386 |
| 6,776,151 B2 | 8/2004 | Wiersma et al. | |
| 6,874,495 B2 | 4/2005 | McFadden | |
| 7,009,147 B1 | 3/2006 | Schulte | |
| 7,055,518 B2 | 6/2006 | McFadden et al. | |
| 7,220,944 B2 | 5/2007 | Miller et al. | |
| 7,235,763 B2 * | 6/2007 | Christiaansen | H05B 6/6485 |
| | | | 219/460.1 |
| 7,360,533 B2 | 4/2008 | McFadden | |
| 7,507,938 B2 | 3/2009 | McFadden | |
| 7,836,875 B2 | 11/2010 | McFadden et al. | |
| 7,886,658 B2 | 2/2011 | McFadden et al. | |
| 7,946,224 B2 | 5/2011 | McFadden | |
| 7,997,189 B1 | 8/2011 | Baker et al. | |
| 8,006,685 B2 | 8/2011 | Bolten et al. | |
| 8,011,293 B2 | 9/2011 | McFadden et al. | |
| 8,035,062 B2 | 10/2011 | McFadden et al. | |
| 8,076,614 B2 | 12/2011 | Baker et al. | |
| 8,272,320 B2 | 9/2012 | Baker et al. | |
| 8,294,070 B2 | 10/2012 | McNamee et al. | |
| 8,297,270 B2 | 10/2012 | McFadden | |
| 8,642,928 B2 | 2/2014 | Schulte | |
| 8,658,953 B2 | 2/2014 | McFadden et al. | |
| 8,893,705 B2 | 11/2014 | McFadden | |
| 2009/0139976 A1 | 6/2009 | Lee | |
| 2009/0178575 A1 | 7/2009 | Baker et al. | |
| 2011/0276184 A1 | 11/2011 | McKee et al. | |
| 2013/0239945 A1 | 9/2013 | Han et al. | |
| 2014/0216434 A1 | 8/2014 | Moreth, III et al. | |
| 2014/0261371 A1 | 9/2014 | Van Camp et al. | |
| 2014/0348987 A1 * | 11/2014 | Cheng | A47J 27/04 |
| | | | 426/231 |

OTHER PUBLICATIONS

Written Opinion of International Searching Authority for PCT/US2016/029346 dated Jul. 27, 2016.

* cited by examiner

OVEN BASED ON A COMBINATION OF HEATED AIR AND INFRARED HEATING ELEMENT

FIELD OF INVENTION

The present invention relates to cooking ovens in general, and in particular to a cooking oven based on a combination of rapidly moving heated air and infrared heating element.

BACKGROUND OF THE INVENTION

Hot air convective cooking is achieved by directing rapidly moving heated air at the food. Hot air heated in an air plenum is introduced into the oven cavity via air channels interconnecting the air plenum and the oven cavity. In general, optimal cooking air temperatures are in the 450 F°-500° F. range for non-bakery items, and in the 375° F. range for bakery items.

Infrared ("IR") heating is another well-known cooking method, whereby electromagnetic waves emitted by a heat source (typically a heating element in the form of a resistance wire) are absorbed by food. Cooking efficiency is achieved by matching the wavelength of the infrared radiation to the absorption characteristics of the food material. In general, IR heating is considered to be most efficient in cooking food when the heating element is at or near 1,200° F.—since the wavelength emitted at that temperature most closely matches food.

So far, attempts to combine heated air and IR heating have achieved limited commercial success due to certain technical challenges as discussed below.

Hot air for cooking food is typically at a temperature (e.g., 450 F°-500° F.) well below the temperature of the IR heating element (ideally at 1,200° F.). Hence, rapidly moving air at a much lower temperature cools the hotter IR heating element in the same oven cavity very quickly. To avoid this problem, an oven having both hot air and IR heating elements needs to separate the airstream from the IR heating element. However, prior attempts to solve this problem were not satisfactory.

For example, U.S. Pat. No. 4,756,091 to Van Denend describes entry of hot air into the oven cavity via tubes, with those tubes being separated from the IR heating elements. However, an IR heating element at a temperature near 1,200° F. emits heat towards the surrounding structure such as air plenum. When the plenum gets hot (such as to 800° F. or more), it is no longer possible to keep the air temperature in the desired range (such as between 450° F. and 500° F.).

Previous attempts to isolate hot air from the IR heating elements have also included the use of IR heating elements which are housed in or shielded behind isolating surfaces made of glass or ceramic, or reflectors, as described in U.S. Pat. No. 6,521,870 to Nolan et al. and U.S. Pat. No. 6,114,664 to Cook et al. However, those attempts did not provide satisfactory solutions because (1) over time, the glass or ceramic surfaces and reflectors became splattered with grease which burned on to that surface and continually degraded the IR emissivity; and (2) ultimately, the glass or ceramic materials chipped or broke, landing on the food being cooked in the oven cavity.

BRIEF DESCRIPTION OF THE DRAWINGS

The invention itself, as well as a preferred mode of use, further objects, and advantages thereof, will best be understood by reference to the following detailed description of illustrative and exemplary embodiments when read in conjunction with the accompanying drawings, wherein.

SUMMARY OF THE INVENTION

It has now been found that the above and related objects of the present invention are obtained in the form of several related aspects, including an oven based on a combination of heated air and infrared heating element.

More particularly, the present invention relates to an oven comprising a housing, a cavity located within the housing, wherein the housing includes an opening to the cavity, an oven door for covering the opening, an air plenum, an air heating element for heating air in the air plenum, an infrared heating element for providing heat to the cavity, the infrared heating element comprising a wire-like heating element shaped in a serpentine pattern to form a plurality of fingers, and a thermal insulating layer placed between the infrared heating element and the air plenum, the thermal insulating layer comprising a plurality of air channels interconnecting the air plenum and the cavity and one or more temperature decoupling chambers for thermally insulating the air plenum from the infrared heating element, wherein the plurality of air channels are positioned interleavingly between the plurality of fingers so that air streams coming from the air plenum through each of the air channels into the cavity do not substantially contact the infrared heating element.

In at least one embodiment, the temperature decoupling chambers use air as a thermal insulator.

In at least one embodiment, the oven further comprises a user interface for controlling the infrared heating element.

In at least one embodiment, the oven further comprises a user interface for controlling a temporal profile and a power level of the infrared heating element.

In at least one embodiment, the user interface comprises an option to control the infrared heating element to be used solely to boost heated air temperature within the cavity.

In at least one embodiment, the thermal insulating layer in the oven comprises a stainless steel sheet.

In at least one embodiment, the vertical length of each of the plurality of air channels is between 0.5 inches and 12 inches.

In at least one embodiment, the closest distance between the air outlet side of the plurality of air channels and the infrared heating element is between 0.1 inches and 4 inches.

In at least one embodiment, the closest distance between the surface of the thermal insulating layer on the air outlet side and the infrared heating element is between 0.1 inches and 1 inch.

All features and advantages of the present invention will become apparent in the following detailed written description.

DETAILED DESCRIPTION OF PREFERRED EMBODIMENTS

Figure 1A:
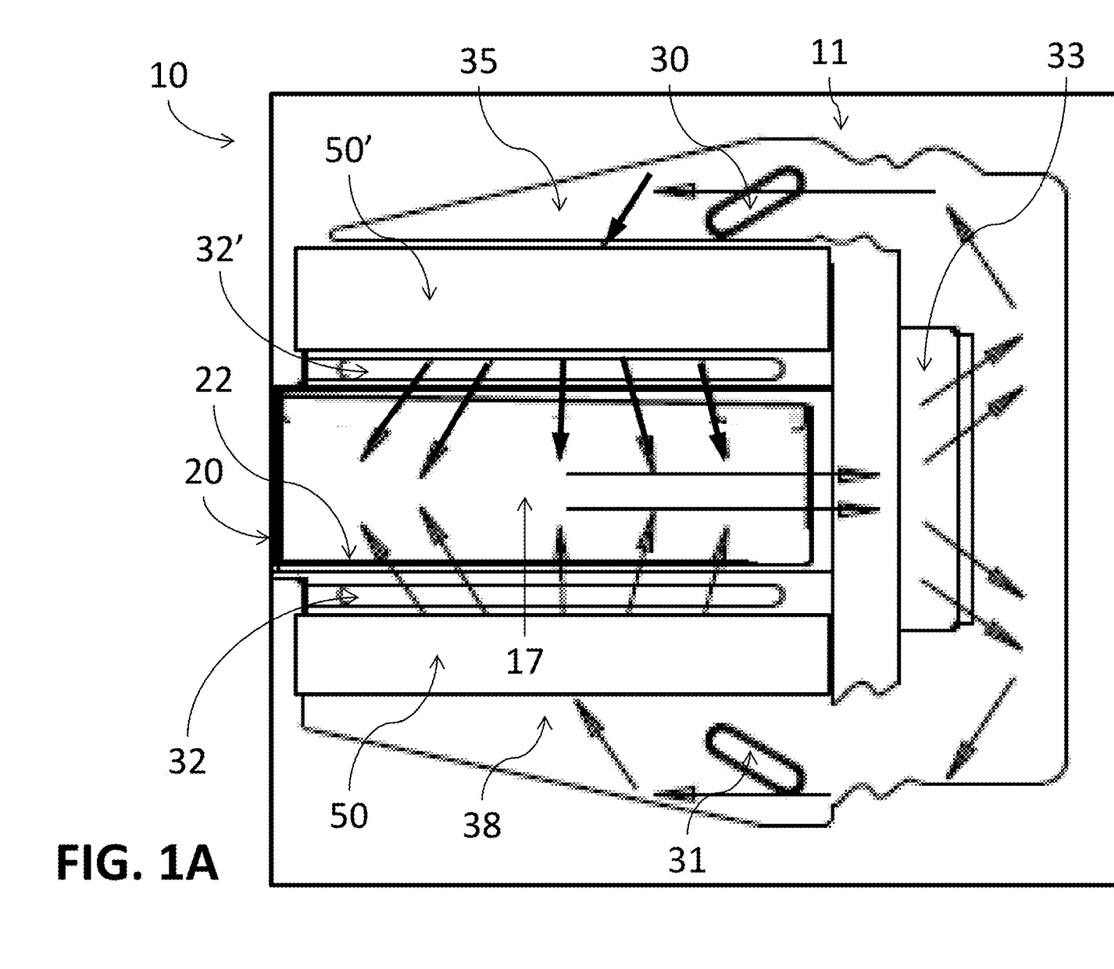
FIG. 1A-1B are respectively side cross-sectional view and front cross-sectional view of a cooking oven, in accordance with an exemplary embodiment of the present invention.
Figure 1B:
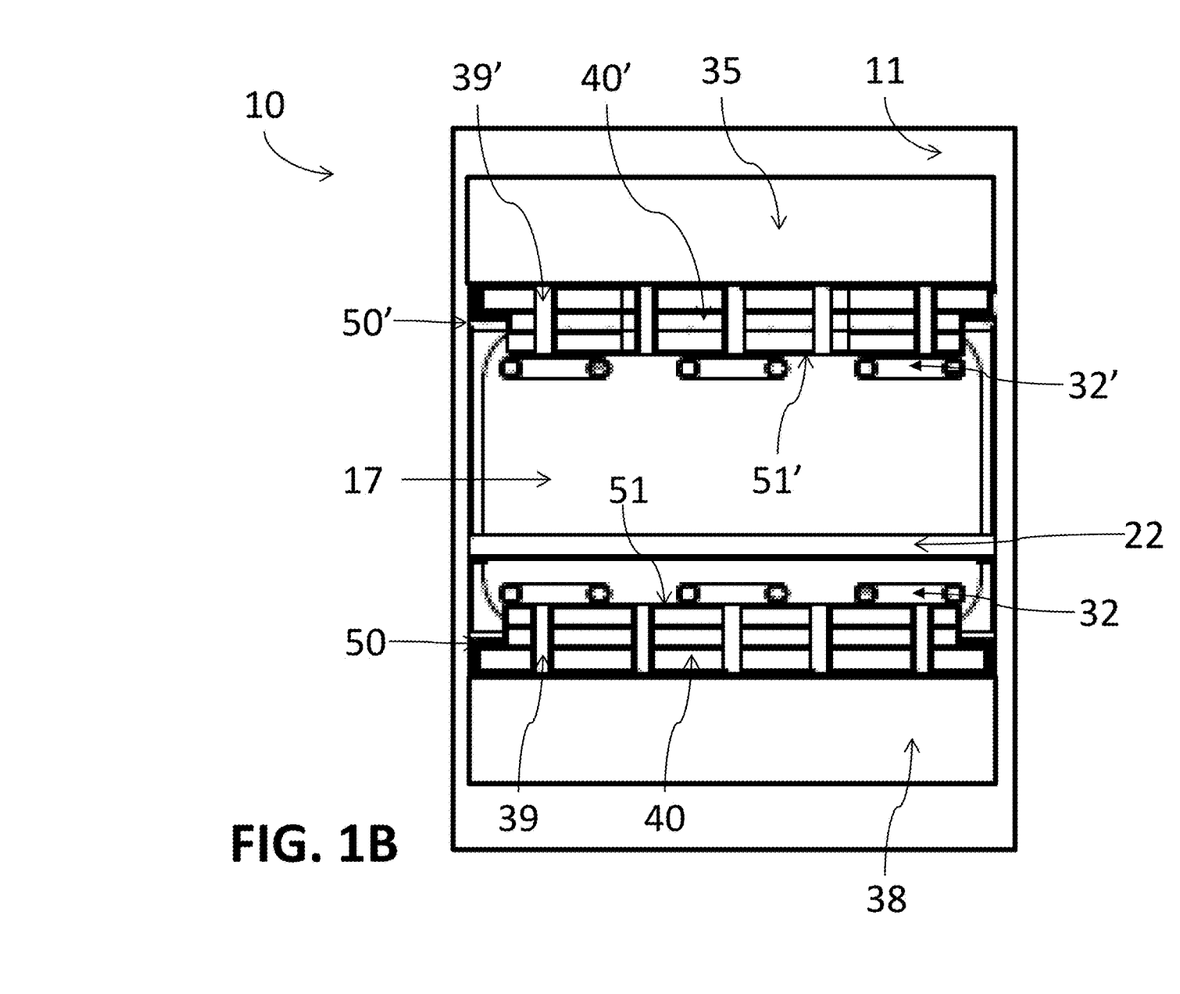

Referring now to the drawings and in particular to FIGS. 1A and 1B, there are depicted respectively side and front cross-sectional views of an oven, in accordance with an exemplary embodiment of the present invention. As shown, an oven 10 includes a housing 11, a cavity 17 located within the housing, and an oven door 20 for covering an opening to the cavity, through which a food item may be loaded on a food loading section 22 in the cavity for cooking.

The oven 10 includes a heating and airflow system to supply heat to cavity 17 for heating up any food items that have been placed within the cavity 17. The heating and airflow system may include a top air heating element 30 for heating air in a top air plenum 35, and/or a bottom air heating element 31 for heating air in a bottom air plenum 38. The heating system may also include a top infrared (IR) heating element 32' located below the top air plenum 35, and/or a bottom IR heating element 32 located above the bottom air plenum 38 and below the food loading section 22. It is understood by those skilled in the art that other heating means, such as microwave, steam or a combination thereof, can also be used in addition to air/IR heating elements 30-32.

As shown in FIGS. 1A and 1B, top air plenum 35 and top IR heating element 32' are separated by a top thermal insulating layer 50'. The top thermal insulating layer 50' comprises a plurality of air channels or air tubes 39' that enable top air plenum 35 to be in gaseous communication with cavity 17. The top thermal insulating layer 50' may also comprise one or more temperature decoupling chambers 40' for thermally insulating top air plenum 35 from top IR heating element 32'. For example, the temperature decoupling chambers 40' may be filled with air which can act as a thermal insulator.

Likewise, bottom air plenum 38 and bottom IR heating element 32 are separated by a bottom thermal insulating layer 50. The bottom thermal insulating layer 50 comprises a plurality of air channels or air tubes 39 that enable bottom air plenum 38 to be in gaseous communication with cavity 17. The bottom thermal insulating layer 50 may also comprise one or more temperature decoupling chambers 40 for thermally insulating bottom air plenum 38 from bottom IR heating element 32. For example, the temperature decoupling chambers 40 may be filled with air which can act as a thermal insulator.

Air may be heated by either top air heating element 30 or bottom air heating element 31 or both before entering the oven cavity 17 through air channels 39', 39. The heated air can be directed to the cavity via either top air plenum 35 or bottom air plenum 38 or both. In alternative embodiments, air could enter cavity 17 either through top air plenum 35 or bottom air plenum 38 at any given time, but not through both plenums 35, 38 simultaneously. The air within the cavity 17 is subsequently taken out of the cavity 17 via a centrifugal blower 33. The blower 33 then moves the air into top air plenum 35 and/or bottom air plenum 38. FIG. 1A shows a set of arrows that indicates general directions of the air flow when the oven 10 is in operation, in accordance with an exemplary embodiment of the present invention.

Figure 2A:
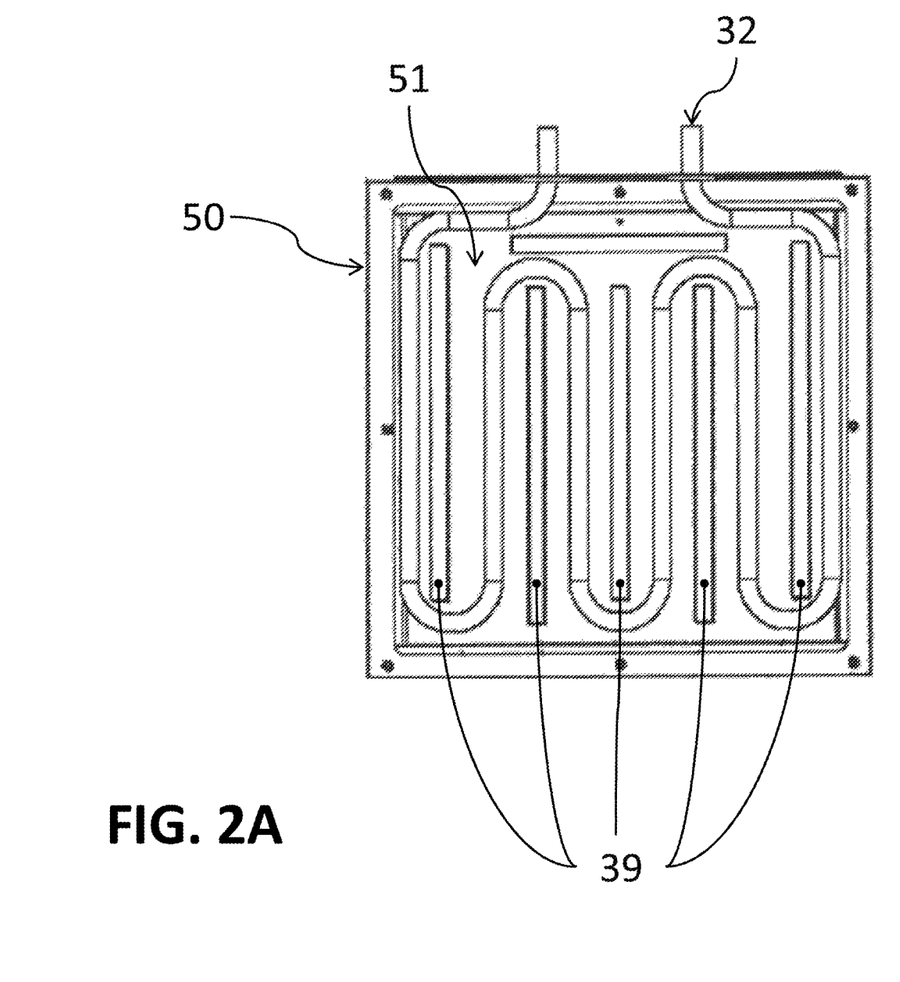
FIGS. 2A-2B are respectively top view and isometric cutaway view of the bottom infrared heating element and the bottom thermal insulating layer for the oven from FIG. 1, in accordance with an exemplary embodiment of the present invention.
Figure 2B:
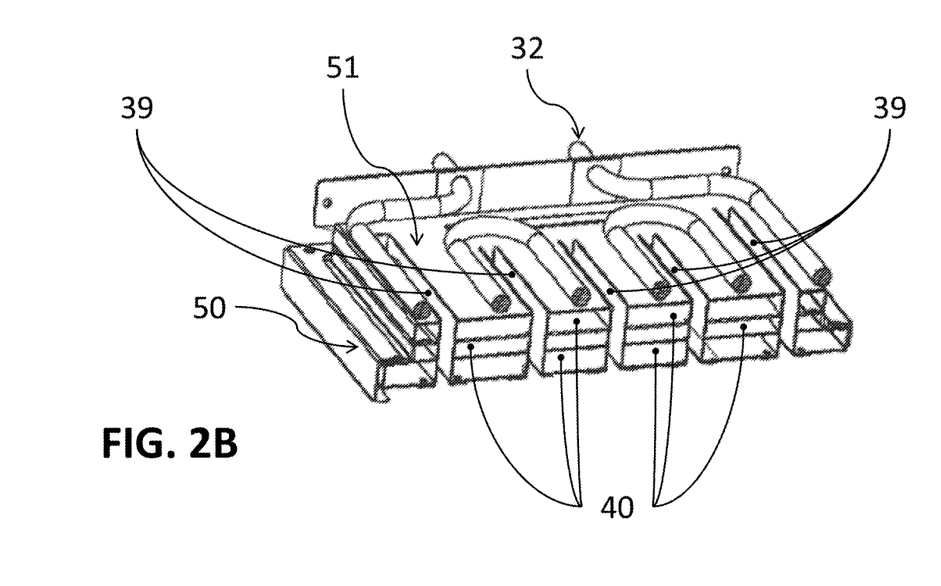

Referring now to FIGS. 2A-2B, there are illustrated a top view and an isometric cutaway view of the bottom infrared heating element 32 and the bottom thermal insulating layer 50. The top infrared heating element 32' and the top thermal insulating layer 50' may be substantially identical in structure to their bottom counterparts 32, 50 shown in FIGS. 2A-2B, except that the top components would be oriented upside down.

In this exemplary embodiment of the present invention, the air channels 39 for bringing heated air from the air plenum 38 into oven cavity 17 are separated from the IR heating element 32 in such a way that the IR heating element 32 is not substantially cooled by rapidly moving airstream coming through air channels 39 at a lower temperature and is allowed to quickly reach and maintain the desired temperature—typically in the 1,200° F. range.

While FIGS. 2A and 2B show air channels 39 in the form of multiple rectangular shaped tubes, it is understood by those skilled in the art that air channels may alternatively take the form of one of various other air opening configurations such as conical shaped nozzles and the like.

Preferably, the air channels 39 are placed far enough apart to enable air to be moved directly towards the surface of the food at the desired air velocity—but close enough together to offer full and even hot air cooking coverage (i.e., no "cold spots" or "hot spots"). The IR heating element 32 is configured to be placed between the air channels 39, but placed far enough away from the air channels to keep it from being in contact with airstreams coming out of the air channels. For example, the closest distance between the air outlet side of each of air channels 39 and IR heating element 32 may be no less than 0.1 inches and no greater than 4 inches.

At the same time, the IR heating element 32 is preferably spread sufficiently widely to offer full and even IR heating coverage in the cavity 17 (i.e., no "light spots" or "dark spots"). As shown in FIG. 2A, a single IR heating element 32 may be used instead of multiple IR heating elements for several reasons, including continuity of temperature and cost.

As shown in FIG. 2A, IR heating element 32 may comprise a wire-like heating element shaped in a serpentine-like pattern to form multiple U-shape fingers. While five U-shape fingers are shown in FIG. 2A, the number and shape of U-shape fingers in the IR heating element 32 may vary depending on, for example, the size of the oven cavity 17 and/or the number and configuration of air channels 39.

The IR heating element 32 may further comprise an outer sheathing covering a resistance wire. Within the sheathing, a temperature sensor or thermocouple (not shown) may be embedded to measure the operating temperature of IR heating element 32 so that when the rapidly moving hot air cools IR heating element 32 and thereby reduces its infrared radiation output, control circuitry may supply higher power for maintaining the same infrared output. In other words, to the extent that air moving by IR heating element 32 impacts its temperature, the IR heating element can maintain a constant temperature by using feedback control and applying variable power.

In addition, the IR heating element 32 may be designed to gain heat quickly and lose heat quickly. This feature could be important when the oven needs to alternately cook different food items, some of which require heat from IR heating element 32 at 1,200° F. and some of which do not require heat from IR heating element 32 but need to be cooked at a much lower temperature.

As shown in FIGS. 2A and 2B, a plurality of air channels 39 may be interleavingly located between the U-shape fingers of IR heating element 32. Air channels 39 are designed to prevent hot airstreams from substantially contacting and thereby convectively cool IR heating element 32.

In alternative embodiments, the vertical length of each of air channels 39 may correspond to the thickness of thermal insulating layer 50, which separates air plenum 38 from IR heating element 32. Preferably, each of air channels 39 has sufficiently long vertical length so that the rapidly moving heated air delivered by blower 33 through plenum 38 and into air channels 39 develops sufficient directionality to emerge from the air outlet side of air channels 39 without being substantially dispersed, thereby passing the adjacent IR heating element 32 without substantially contacting it. At the same time, preferably, the vertical length of each of air channels 39 is not so long as to unnecessarily increase the height and related manufacturing cost of the oven.

As an example, the optimal vertical length of air channel 39 may be between 0.5 inches and 12 inches. On the one hand, the vertical length less than 0.5 inches would not provide sufficiently thick thermal insulating layer 50 to thermally insulate air plenum 38 from the heat generated by the IR heating element 32. On the other hand, the vertical length greater than 12 inches (or greater than 20 inches for both top and bottom air channels 39', 39) would make the oven too tall and unnecessarily increase the related manufacturing cost.

As shown in FIGS. 1A-1B and 2A-2B, a thermal insulating layer 50 may be placed between IR heating element 32 and air plenum 38 so that air plenum 38 is not substantially heated by IR heating element 32 and the temperature in air plenum 38 can be kept in the desired temperature range (such as 450° F.-500° F. range) when IR heating element 32 is on. In this way, the temperature of IR heating element 32 can be increased without materially increasing the temperature of the air in the air plenum 38.

As shown in FIG. 2B, the thermal insulating layer 50 may comprise one or more temperature decoupling chambers 40, which are located underneath each of the U-shape fingers of IR heating element 32. Temperature decoupling chambers 40 are designed to thermally insulate air plenum 38 from IR heating element 32 so that IR heating element 32 does not conductively heat air plenum 38. For example, the temperature decoupling chambers 40 may be filled with air which can act as a thermal insulator.

For example, the thermal insulating layer 50 may be made of stainless steel sheets separated by one or more gaps forming temperature decoupling chambers 40 (e.g., gaps filled with a thermal insulator such as air). Air tubes may be inserted in the openings of the stainless steel sheets to form air channels 39 such that the heated air enters the air channels 39 from the air plenum side 38 and exits into the cook cavity side 17. Such airstreams into the cavity would be adjacent to, but not in contact with, the IR heating element 32. As a result, this exemplary embodiment of the present invention enables a relatively tight range of air temperatures to be delivered simultaneously with heat from IR heating element 32 to a food item located within the oven cavity 17.

In alternative embodiments, the temperature decoupling chambers 40 may also serve as a heat sink for the heat generated by the IR heating element 32. This has the additional benefit of smoothing out the changes in the air temperature in the oven cavity 17 as the IR heating element 32 rapidly heats and cools.

In alternative embodiments, the vertical length of each of air channels 39 may correspond to the thickness of thermal insulating layer 50, or the height of temperature decoupling chambers 40, which separate air plenum 38 from IR heating element 32. This can be measured by the distance between the top of air plenum 38 and the surface 51 of thermal insulating layer 50 on the air outlet side ("insulating layer output surface"). Preferably, the vertical length of each of air channels 39 and/or the closest distance between insulating layer output surface 51 and IR heating element 32 may be dimensioned to optimize the isolation or decoupling of the heated air at a relatively cooler temperature (such as 450° F.-500° F.) moving through air channels 39 from IR heating element 32 at a higher temperature (such as 1,200° F.), without adding unnecessary height or manufacturing cost to oven 10. For example, the vertical length of air channels 39 may be between 0.5 inches and 12 inches, and the closest distance between insulating layer output surface 51 and IR heating element 32 may be between 0.1 inches and 1 inch.

Some food items, such as certain vegetables, may need to be cooked with hot air only, and IR heating element 32, 32' should be turned off or should only be barely turned on to keep the surface of such food items from burning. With those food items, the air temperature within cavity 17 is preferably controlled within a relatively tight range. On the other hand, some food items, such as broiled shrimp, may need to be cooked with heat generated by IR heating element 32, 32' operating at 1,200° F. Suffice to say, there are also some food items that may need to be cooked with appropriate combination of hot air and heat from IR heating element 32, 32'.

These various cooking needs can be satisfied by operating the oven as an "IR only" oven, or an "hot air only" oven, or anywhere in between (e.g., 75% IR and 85% air; 100% IR and 45% air; etc.). The exemplary embodiments of the present invention described above can meet this objective by isolating or decoupling the air heating elements (e.g., air plenum 38) from the IR heating element (e.g., IR heating element 32).

In addition, by enabling independent top and bottom IR adjustments within each cook setting, the oven may be able to deliver independent top and bottom heat with only one blower—thus reducing the manufacturing cost considerably as opposed to having two distinct air delivery systems.

A cavity heater is typically used to keep the air temperature in the oven cavity from going too low. However, when not operating at a high temperature (e.g., 1,200° F.) to deliver full IR heating to the food, the IR heating element 32', 32 can also be used as means for boosting the air temperature in the oven cavity 17. This can be useful because some food items are not optimally cooked with IR heating. In cases where a food is best cooked exclusively or primarily with hot air, the IR heating element can be kept on at a reduced temperature such that it has some heating impact on the air in the cavity but does not have significant IR heating impact on the food. Such a feature would make it possible to have a reduced cavity heater size relative to ovens which cook only with heated air.

This object can be achieved by using a suitable heater control (e.g., user interface to control the IR heating element) to direct the IR heating element to serve as a booster air temperature heater to only provide the air heating capability that the downsized cavity heaters are not capable of providing.

In alternative embodiments, this heater control element may be further configured to manage whatever imperfection there may be in keeping the heated air and the IR heating element isolated or decoupled from each other. This may allow the IR heating element to operate at the highest possible temperature without substantially increasing the temperature of the heated air in the oven from the desired range. Despite the challenges due to the relatively long time delay between turning the IR heating element on and measuring a temperature rise in the air, the heater control element, such as the one described herein, may be configured to make it seamless to the user.

Figure 3A:
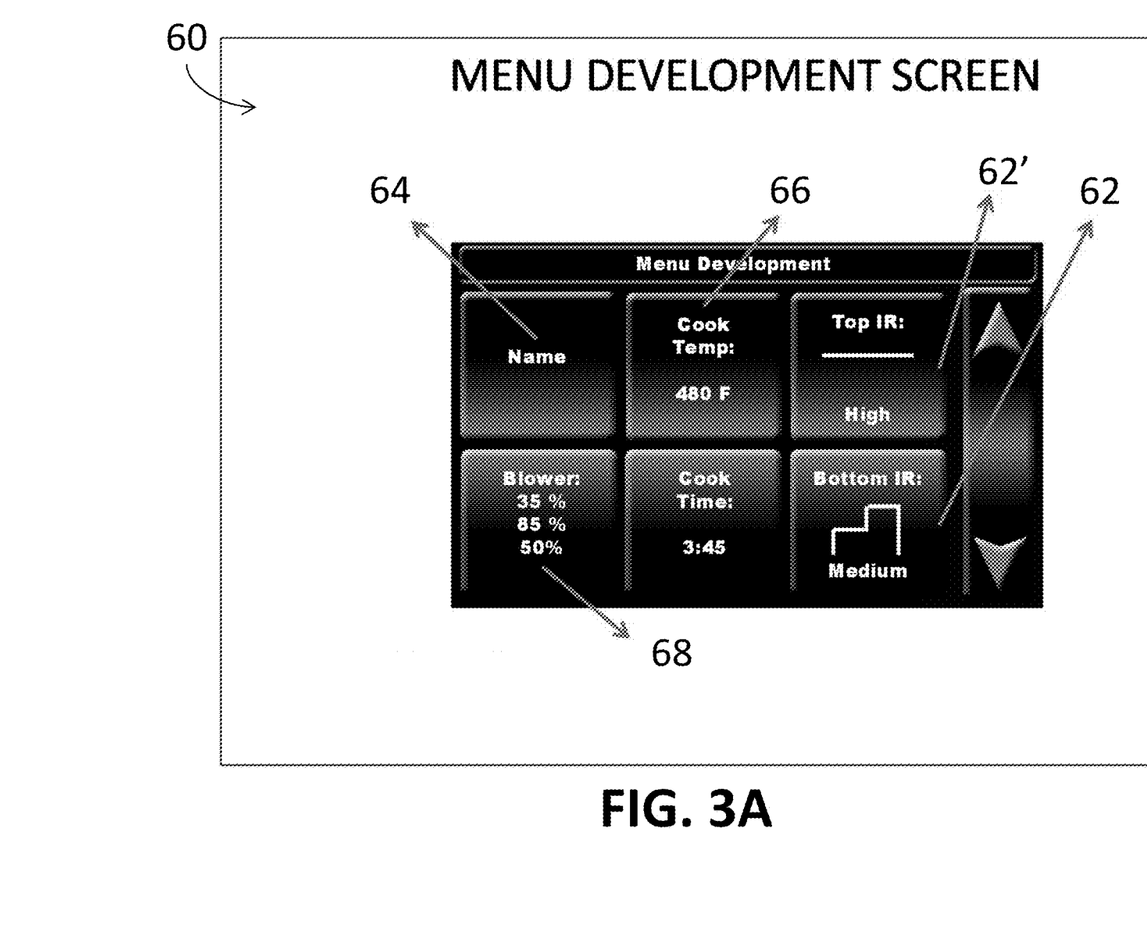
FIGS. 3A-3B illustrate exemplary user interfaces for the oven from FIG. 1, in accordance with an exemplary embodiment of the present invention.

In this connection, an exemplary embodiment of the present invention may further provide a user interface on the oven for entering IR heating settings. FIG. 3A illustrates an exemplary user interface screen 60 (e.g., menu development screen). The user interface screen 60 may comprise a button 64 for a keyboard screen, a button 66 for a number pad screen, and a button 68 for a blower screen to select from multiple stages and input total time of stages (e.g., cook time). The user interface screen 60 may use a format generally in line with the industry standard for cook setting development, except that the screen additionally has a button 62' for controlling top IR heating element 32' and a button 62 for controlling bottom IR heating element 32, either of which takes the user to the IR heating control screen, which is illustrated in FIG. 3B.

Figure 3B:
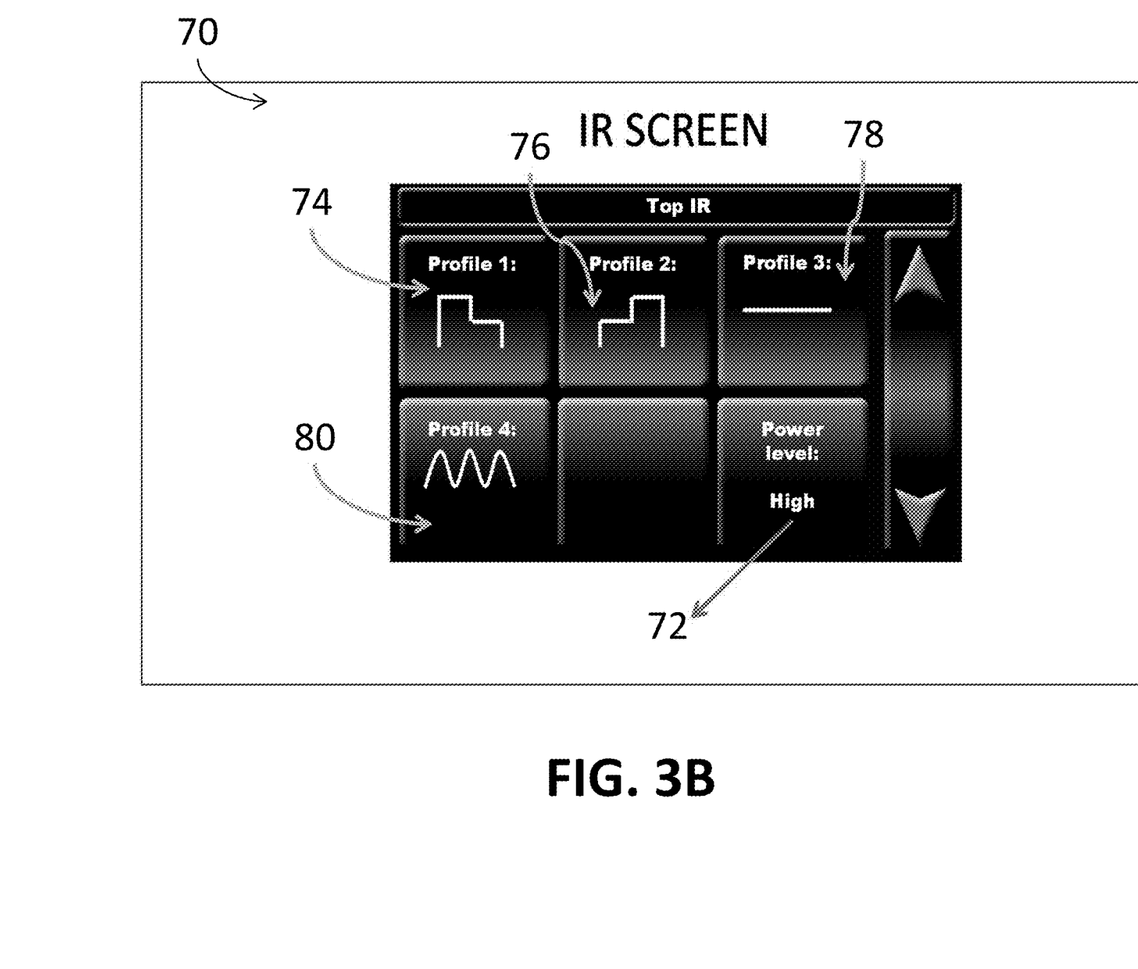

As shown in FIG. 3B, once at the IR screen 70 (e.g., "Top IR" for controlling top IR heating element 32'), the user may select one of various possible IR power levels and one of various possible IR temporal profiles to control the IR heating element (e.g., top IR heating element 32'). For example, selectable IR power levels may comprise off (e.g., using the IR heating element solely to boost heated air temperature), low, medium, and high. The user may select one of these IR power levels by scrolling through a button 72 on the IR screen 70. As shown in FIG. 3B, exemplary IR temporal profiles may comprise "Profile 1" for initially high and then low, step-down IR power levels (which can be selected by a button 74), "Profile 2" for initially low and then high, step-up IR power levels (which can be selected by a button 76), "Profile 3" for constant IR power level (which can be selected by a button 78), and "Profile 4" for oscillating IR power (which can be selected by a button 80).

As has been described, the present invention provides an improved oven that utilizes a combination of heated air and IR heating element for cooking food elements.

While this invention has been described in conjunction with exemplary embodiments outlined above and illustrated in the drawings, it is evident that many alternatives, modifications and variations in form and detail will be apparent to those skilled in the art. For example, alternative embodiments of the present invention may be implemented in various types of cooking ovens such as an oven having a rotating door described in U.S. patent application Ser. No. 14/045,257, or an oven having an H-shaped rotating door described in U.S. patent application Ser. No. 14/635,765. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. An oven comprising:
a housing;
a cavity located within the housing, wherein the housing includes an opening to the cavity;
an oven door for covering the opening;
an air plenum;
an air heating element for heating air in the air plenum;
an infrared heating element for providing heat to the cavity, the infrared heating element being shaped in a serpentine pattern to form a plurality of fingers; and
a thermal insulating layer placed between the infrared heating element and the air plenum, the thermal insulating layer comprising a plurality of air channels interconnecting the air plenum and the cavity and at least two stories of vertically stacked temperature decoupling chambers for thermally insulating the air plenum from the infrared heating element,
wherein each of the air channels comprises a rectangular tube having a width, a horizontal length, and a vertical length, the width and the horizontal length defining an elongated slit, and the vertical length being equal to a height of the at least two stories of vertically stacked temperature decoupling chambers,
the plurality of air channels are positioned interleavingly between the plurality of fingers so that airstreams coming from the air plenum through each of the air channels into the cavity do not substantially contact the infrared heating element, and
the thermal insulating layer is configured to prohibit gaseous communication between each of the temperature decoupling chambers and the air plenum and prohibit gaseous communication between each of the temperature decoupling chambers and the cavity, so that air in each of the temperature decoupling chambers acts as a thermal insulator.

2. The oven of claim 1, further comprising a user interface for controlling a temporal profile and a power level of the infrared heating element.

3. The oven of claim 2, wherein the user interface comprises an option to control the infrared heating element to be used solely to boost heated air temperature within the cavity.

4. The oven of claim 1, wherein the thermal insulating layer comprises a stainless steel sheet.

5. The oven of claim 1, wherein the temperature decoupling chambers serve as a heat sink for heat generated by the infrared heating element.

6. The oven of claim 1, wherein the vertical length of each of the air channels is between 0.5 inches and 12 inches.

7. The oven of claim 1, wherein the closest distance between the air outlet side of the plurality of air channels and the infrared heating element is between 0.1 inches and 4 inches.

8. The oven of claim 1, wherein the closest distance between the surface of the thermal insulating layer on the air outlet side and the infrared heating element is between 0.1 inches and 1 inch.

* * * * *